March 4, 1952 — N. M. THOMAS — 2,588,057
LIQUID MEASURING APPARATUS
Filed April 30, 1946
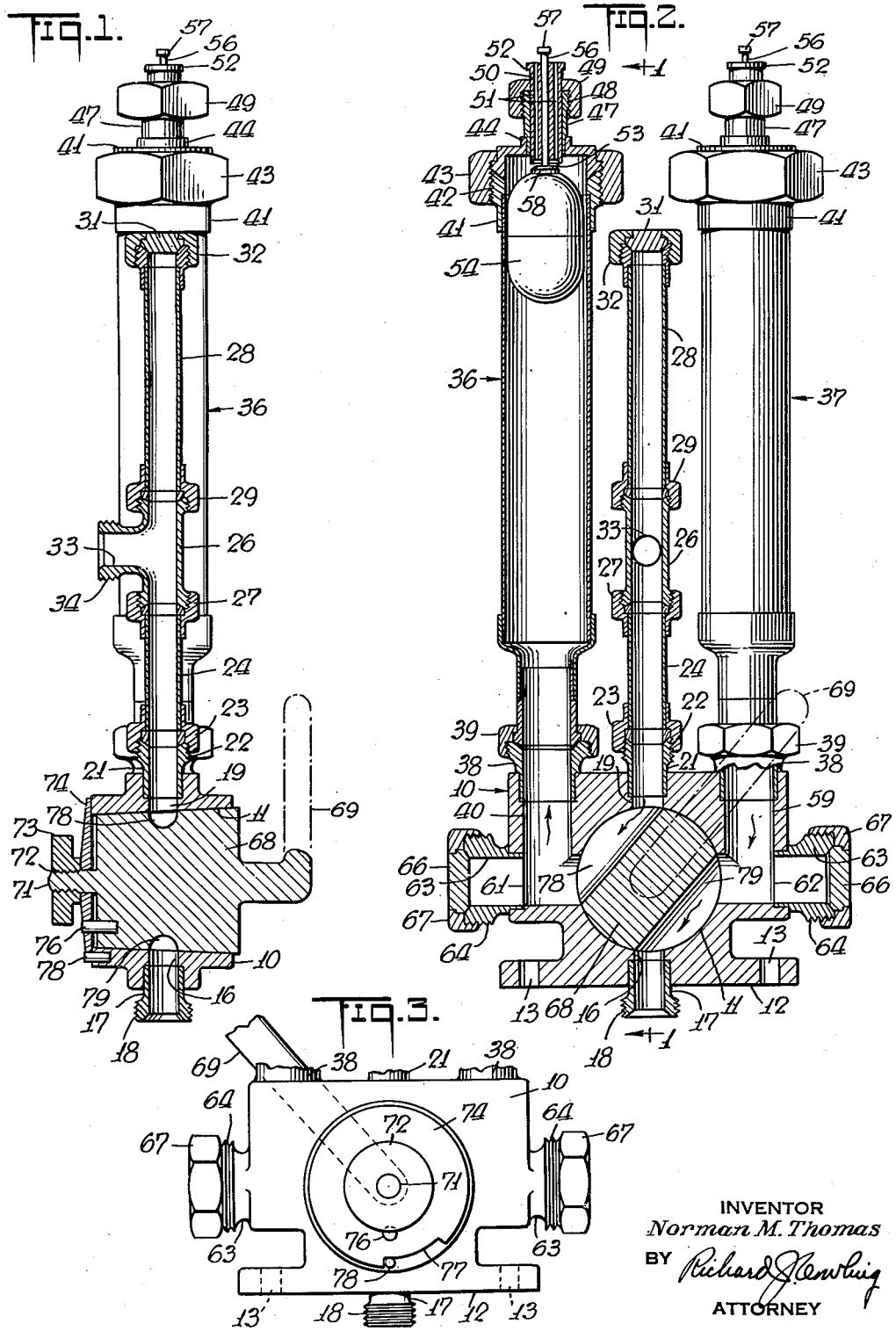

Patented Mar. 4, 1952

2,588,057

UNITED STATES PATENT OFFICE 2,588,057

LIQUID MEASURING APPARATUS

Norman M. Thomas, Medford Lakes, N. J., assignor to Joe Lowe Corporation, New York, N. Y., a corporation of Delaware Application April 30, 1946, Serial No. 666,151

2 Claims. (Cl. 222—69)

The present invention relates generally to measuring apparatus, and it has particular relation to a liquid measuring apparatus having a plurality of reservoirs or measuring chambers whereby one is being filled while the other is being emptied.

An object of the invention is to provide a simple, economical and efficient liquid measuring apparatus which is relatively inexpensive to build and has a minimum of moving parts.

Another object of the invention is the provision of a liquid measuring apparatus that is simple and of a highly sanitary construction, and which is easily and quickly assembled and/or dismantled for cleaning purposes.

A further object of the invention is to provide a novel liquid measuring apparatus of the character described which is capable of adjustment to insure the dispensing of accurately measured quantities of liquid regardless of the viscosity thereof.

Another object of the invention is the provision of a simple, inexpensive and economical liquid measuring apparatus which is equipped with removable measuring chambers, and which is capable of operation with measuring chambers of different sizes depending upon the desired quantities of liquid to be measured and delivered thereby.

A further object of the invention is to provide a novel pressure chamber for a liquid measuring apparatus which will provide an even flow of liquid material thereto even though the same may be delivered thereto in a pulsating manner.

Other and further objects and advantages of the invention, which result in simplicity, economy and efficiency, will be apparent from the following detailed description, wherein a preferred form of embodiment of the invention is shown, reference being had for illustrative purposes to the accompanying drawings, forming a part hereof, wherein like numerals indicate like parts, in which:

Figure 1 is a side vertical sectional view, partly in elevation, of the liquid measuring apparatus shown in Fig. 2, the same having been taken substantially along the line 1—1 thereof, looking in the direction of the arrows;

Figure 2 is a front view of a liquid measuring apparatus made in accordance with the principles of the invention, showing one of the measuring chambers in elevation and the other measuring chamber and intake and pressure chamber in section; and Figure 3 is a fragmentary rear elevational view of the valve casing, showing the manner in which the reciprocatory movement of the valve is controlled or limited.

Referring now to the drawings, and particularly to Figure 2, there is shown a cast metal valve casing 10, having a cylindrically shaped valve chamber 11 formed therein. The casing 10 is provided with an integral depending horizontal flange or base member 12, having a plurality of spaced holes 13 extending vertically therethrough adjacent its outer edges, which holes 13 serve as means for mounting or securing the apparatus on a table top or other supporting structure (not shown). A dispensing outlet 16, connecting with the valve chamber 11, is provided centrally of the bottom of the casing 10, and has a coupling 17 permanently secured therein, which is provided with a series of external threads 18 for removably receiving and connecting a dispensing nozzle, hose or other sanitary fitting (not shown) thereto.

An intake 19 is formed centrally of the upper side of the valve casing 10, and connects with the valve chamber 11 at a point diametrically opposite the dispensing outlet 16. This is for sanitary purposes only, and makes it possible to run a cleaning brush or other member directly through the valve chamber 11. The intake 19 is also provided with a suitable coupling member 21 permanently secured thereto, which is provided with a series of external threads 22 for receiving a union ferrule 23 for connecting the end of a delivery pipe 24 thereto. A sanitary T 26 is mounted on the upper end of the pipe 24 by means of a union ferrule 27. The upper end of the T 26 has a section of pipe 28 connected thereto by means of the union ferrule 29, and the upper end of the pipe 28 is closed by means of a plug or cap 31 secured thereto by means of a union ferrule 32. The closed pipe 28, extending above the T 26, forms a pressure chamber, which becomes filled with compressed air that acts as a cushioning medium or means for causing the flow of liquid into the intake pipe 24 to be even and steady, eliminating any pulsations in the flow of liquid being delivered from an outside source of supply (not shown). The T 26 is provided with a lateral intake 33, which is provided with suitable external threads 34 for connection with the outside source of supply.

A plurality of measuring chambers 36 and 37 are mounted on the top of the casing 10 on opposite sides of the intake 19. The measuring chamber 36 is mounted on the casing 10 by means of a coupling 38 and union ferrule 39. The coupling 38 is permanently secured in a passageway 40 in the casing 10, which connects with the valve chamber 11. Thus, it will be apparent that the measuring chamber 36 is removably secured to the casing 10, and may be removed for purposes of cleaning or for substituting a smaller or larger measuring chamber therefor. The measuring chamber 36 is of tubular construction, and is provided at its upper end with a suitable reducer coupling 41, having external threads 42 adapted to receive a union ferrule 43. The coupling 41 is also provided with an axial flange 44 adjacent its axial opening into which is fitted a fixed split sleeve 47 having its upper end threaded, as indicated at 48, to receive a union ferrule 49. A cylindrically shaped core or plug 50 is slidably and frictionally mounted within the split sleeve 47, and is of a length sufficient to project downwardly into the measuring chamber 36 and upwardly beyond the upper end of the sleeve 47. The ferrule 49 when tightened on the threads 48 of the split sleeve 47 serves to secure the core 50 in a fixed position therein. The plug 50 has an axial bore and a series of circumferentially spaced apertures 51 extending longitudinally therethrough, providing escape ports for any air that becomes entrapped in the measuring chamber. The upper end of the plug 50 is provided with a laterally extending or radial flange 52, which is adapted to limit the downward movement thereof, thereby preventing the plug 50 from slipping down into the measuring chamber 36. The lower or opposite end of the plug 50 is conically recessed, as indicated at 53, to provide a suitable valve seat. A float 54 is adapted to be mounted slidably in the measuring chamber 36, and has a rod 56 projecting axially upwardly therefrom. The rod 56 is of sufficient length to pass through the axial bore 51 of the core or plug 50 and project outwardly therebeyond. A nut 57 is threaded to the upper end of the rod 56, and serves to limit the downward movement of the rod 56 and consequently its depending float 54. A conically shaped valve member 58 is mounted on the upper end of the float 54 circumferentially of the rod 56, and is adapted to fit into the valve recess 53 of the core 50.

The measuring chamber 37 is of a construction identical to the construction of the measuring chamber 36, and connects with the valve chamber 11 through a suitable passageway 59.

The valve casing 10 is provided with diametrically opposed lateral clean-out openings or passageways 61 and 62, each of which is provided with a suitable coupling 63 having external threads 64. The openings in each of the couplings 63 are adapted to be closed by conventional sanitary fittings consisting of a cap 66 and a union ferrule 67, the latter being threadingly mounted on the threads 64 thereof.

The cylindrically shaped valve chamber 11 in the casing 10 is adapted to receive frictionally a removable reciprocatory valve member 68 of substantially the shape of a truncated (see Fig. 1) cone, having a manipulating handle 69 mounted axially on the front end thereof, as best shown in Fig. 1. The rear or opposite end of the valve member 68 is provided with an axial stub shaft 71, having its outer end externally threaded, as indicated at 72, for receiving a locking nut 73. An end closure plate 74 is adapted to be fitted over the shaft 71, and is fixedly secured to the valve 68 by means of a dowel pin 76. The lower edge of the plate 74 is recessed arcuately, as indicated at 77, (see Fig. 3) to provide a cam conformation for limiting the reciprocatory movement of the valve member 68. A locking pin 78 mounted in the casing 10 serves to engage the lateral extremities of the cam conformation 77 to limit the rotary movement of the valve member 68 in either direction. The valve member 68 is recessed on opposite sides, as indicated at 78 and 79, to provide passageways for the liquid material to pass therethrough.

In the operation of the liquid measuring apparatus, it is assumed the handle 69 is in the position shown in Figure 2 of the drawings, and that both measuring chambers or tanks 36 and 37 are empty, with their respective floats 54 being in their downward position due to the action of gravity. The liquid to be measured enters the lateral port 33 of the T 26, and flows through the T 26 downwardly through the pipe 24 into the valve chamber 11, passing through the passageway 78 of the valve 68 into the port 40 and upwardly into the measuring chamber 36. The liquid will also tend to flow upwardly into the pipe 28 until the entrapped air therein has been compressed sufficiently to compensate for the pressure of the liquid in the line. As the liquid rises in the measuring chamber 36, it will force the entrapped air therein upwardly and out through the ports 51, and, when it reaches the float 54, it will cause the float to rise with the rising liquid until the valve 58 thereon becomes seated in its recess 53. Thereupon, no more liquid can be forced into the measuring chamber 36 as it will be filled.

The operating handle 69 is now moved in its opposite direction until the other side of the recess 77 engages the stop pin 78, in which position the passageway 78 in the reciprocating valve 68 is moved so as to connect the port 40 with the dispensing outlet 16, thereby permitting the fluid in the measuring chamber 36 to flow out by gravity through the outlet 16. At the same time, the opposite passageway 79 in the valve 68 is connected with the intake 19 and the port 59 of the measuring chamber 37, allowing the liquid being forced into the apparatus to flow into the chamber 37. The liquid fills the measuring chamber 37 in the manner described previously for filling the measuring chamber 36 while the latter is emptying or discharging its liquid contents through the dispensing outlet 16. It will be apparent that the operation of the dispensing apparatus is substantially continuous, one chamber being filled with new liquid while the other chamber is emptying its accurately measured liquid. By reciprocating or reversing the position of the handle 69 the actions of the measuring chambers are reversed in endless cycles.

It is obvious that the amount of liquid to be dispensed at any given time is directly dependent upon the size of the measuring chambers used, and that it is easy to vary the amount of liquid to be dispensed merely by employing a different sized measuring chamber. It will also be apparent that the apparatus will measure different quantities of liquid simultaneously by using measuring chambers of different sizes in lieu of two measuring chambers of the same size.

The operation of the apparatus is accurate and rapid when watery types of liquids are used since such liquids have little or no tendency to adhere or stick to the inner surfaces of the measuring chambers. However, when a heavy viscous or syrupy liquid is being measured there is a tendency for some of the liquid to stick to the inner surfaces of the measuring chambers and flow slowly therefrom. Instead of waiting for the final drops of such viscous liquids to drain from the measuring chambers after each operation, there is provided a novel adjustment for permitting enough additional liquid to be measured each time to allow or compensate for the amount that will normally adhere or stick to the inner surfaces of the measuring chambers. This adjustment is the sleeve 50, which can be moved in the coupling 41 to project a greater distance into the measuring chamber or be entirely withdrawn therefrom. The position of the sleeve 50 and its integrally formed valve seat 53 governs the open and closed position of the float 54, and, within relatively small limits, regulates the amount of material to be contained in the measuring chambers. For example, if the apparatus is adjusted to dispense seventy-two ounces of a viscous liquid at each operation, one ounce thereof, for example, may have a tendency to adhere to the inner sidewalls of the measuring chamber, which would require considerable drainage time to dispense. By repositioning and raising the sleeve 50, the capacity of the measuring chamber may be increased to such an extent that seventy-three ounces can be placed therein. Upon discharge, seventy-two ounces would have a tendency to flow out quickly, and the last ounce or extra ounce would have a tendency to drain out very slowly, but the cycle would have been completed and the chamber would again be filling before the excess would have a chance to drain through the dispensing outlet. It would only be at the very end of the run that the final discharge would contain the additional ounce, and then only after sufficient time has elapsed for complete drainage.

As many changes could be made in the aforementioned illustrated construction, and many apparently widely different embodiments of the invention could be made without departing from the scope of the claims, it is intended that all matter contained in the accompanying drawings shall be interpreted as illustrative and not in a limiting sense.

What I claim is:

1. A liquid measuring apparatus comprising a casing having a valve chamber therein, a reciprocatory valve mounted in said valve chamber, a dispensing outlet in said casing connecting with said valve chamber, an intake in said casing having an inlet connecting a source of supply with said valve chamber, a pressure chamber in open communication with said inlet and said intake, a measuring chamber mounted on said casing and connecting with said valve chamber, said measuring chamber having a valve for permitting the escape of entrapped air therefrom, said valve having an adjustment for varying its position within said measuring chamber to change the measured capacity thereof and means for reciprocating said reciprocatory valve to connect said intake with said measuring chamber when the valve is in one position and to disconnect the intake with said measuring chamber and connect said measuring chamber with said dispensing outlet when the valve is reciprocated to its other position.

2. A liquid measuring apparatus comprising a casing having a valve chamber therein, a reciprocatory valve mounted in said valve chamber, a dispensing outlet in said valve casing connecting with said valve chamber, an intake in said casing having an inlet connecting a source of supply with said valve chamber, a pressure chamber mounted above and in open communication with said inlet and said intake, a pair of measuring chambers mounted on said casing and connecting with said valve chamber, each of said measuring chambers having a valve for permitting the escape of entrapped air therefrom, each of said valves having an adjustment for varying its position within said measuring chamber to compensate for the difference in viscosity of the liquids to be measured thereby, and means for reciprocating said reciprocatory valve to connect said intake with one of said measuring chambers and the outlet with the other measuring chamber when the valve is in one position and to reverse the connections when the valve is moved to its opposite position.

NORMAN M. THOMAS.

REFERENCES CITED

The following references are of record in the file of this patent:

UNITED STATES PATENTS

| Number | Name | Date |
|---|---|---|
| 185,645 | Pennie | Dec. 26, 1876 |
| 472,775 | Verburg | Apr. 12, 1892 |
| 598,035 | Towle | Jan. 25, 1898 |
| 660,102 | Goodlett | Oct. 23, 1900 |
| 1,051,450 | Rider | Jan. 18, 1913 |
| 1,204,324 | Sprague | Nov. 17, 1916 |
| 1,304,437 | Woodward | May 20, 1919 |
| 1,309,688 | Johnson | July 15, 1919 |
| 1,629,821 | Jacovatos | May 24, 1927 |
| 1,965,069 | Cramer | July 3, 1934 |
| 2,188,676 | Grandall | Jan. 30, 1940 |